United States Patent [19]

Fletcher

[11] Patent Number: 4,767,062

[45] Date of Patent: Aug. 30, 1988

[54] AIR FERTILIZER SPREADER

[75] Inventor: Grant Fletcher, Box 261 Crossfield, Alberta, Canada, T0M 0S0

[73] Assignee: Grant Fletcher, Box 261, Crossfield,

[21] Appl. No.: 16,467

[22] Filed: Feb. 17, 1987

Related U.S. Application Data

[63] Continuation of Ser. No. 744,536, Jun. 14, 1985, abandoned.

[51] Int. Cl.⁴ ............................ A01C 3/06; B05B 1/28
[52] U.S. Cl. .................................... 239/655; 239/664; 239/689; 239/151
[58] Field of Search ............... 239/146, 151, 167, 654, 239/655, 664, 689; 406/93, 94; 414/502–505

[56] References Cited

U.S. PATENT DOCUMENTS

| | | | |
|---|---|---|---|
| 1,940,008 | 12/1933 | Mosgrove | 239/664 |
| 2,211,759 | 8/1940 | Pitner | 239/664 X |
| 2,538,756 | 1/1951 | Braswell | 239/654 |
| 2,612,294 | 9/1952 | Dorschner | 239/675 X |
| 3,568,937 | 3/1971 | Grataloup | 239/655 |
| 3,926,377 | 12/1975 | Johnson | 239/655 |
| 4,367,685 | 1/1983 | Frame et al. | 406/93 X |
| 4,427,154 | 1/1984 | Mercil | 239/167 X |
| 4,569,486 | 2/1986 | Balmer | 239/655 |

Primary Examiner—Andres Kashnikow
Assistant Examiner—Patrick N. Burkhart
Attorney, Agent, or Firm—Vincent L. Carney

[57] ABSTRACT

An air fertilizer spreader mounted on a truck chassis, the truck chassis carrying a granular or pulverized fertilizer application machine. Right and left booms swing from a midship position between a truck cab and fertilizer box back towards the rear of the truck chassis. Each boom includes a plurality of boom tubes with deflectors. Rear boom tubes are also provided at the rear of the truck chassis. A screw conveyor carries fertilizer from the fertilizer transport box to an area forward of the fertilizer transport box where the fertilizer falls into opposing metering assemblies for the right and left boom. Air, acting through particle accelerators carries the fertilizer from the metering assembly to the entrance of the boom tubes, and a second particle accelerator provides additional air flow to carry the fertilizer down the length of each of the boom tubes to the point of discharge.

11 Claims, 12 Drawing Sheets

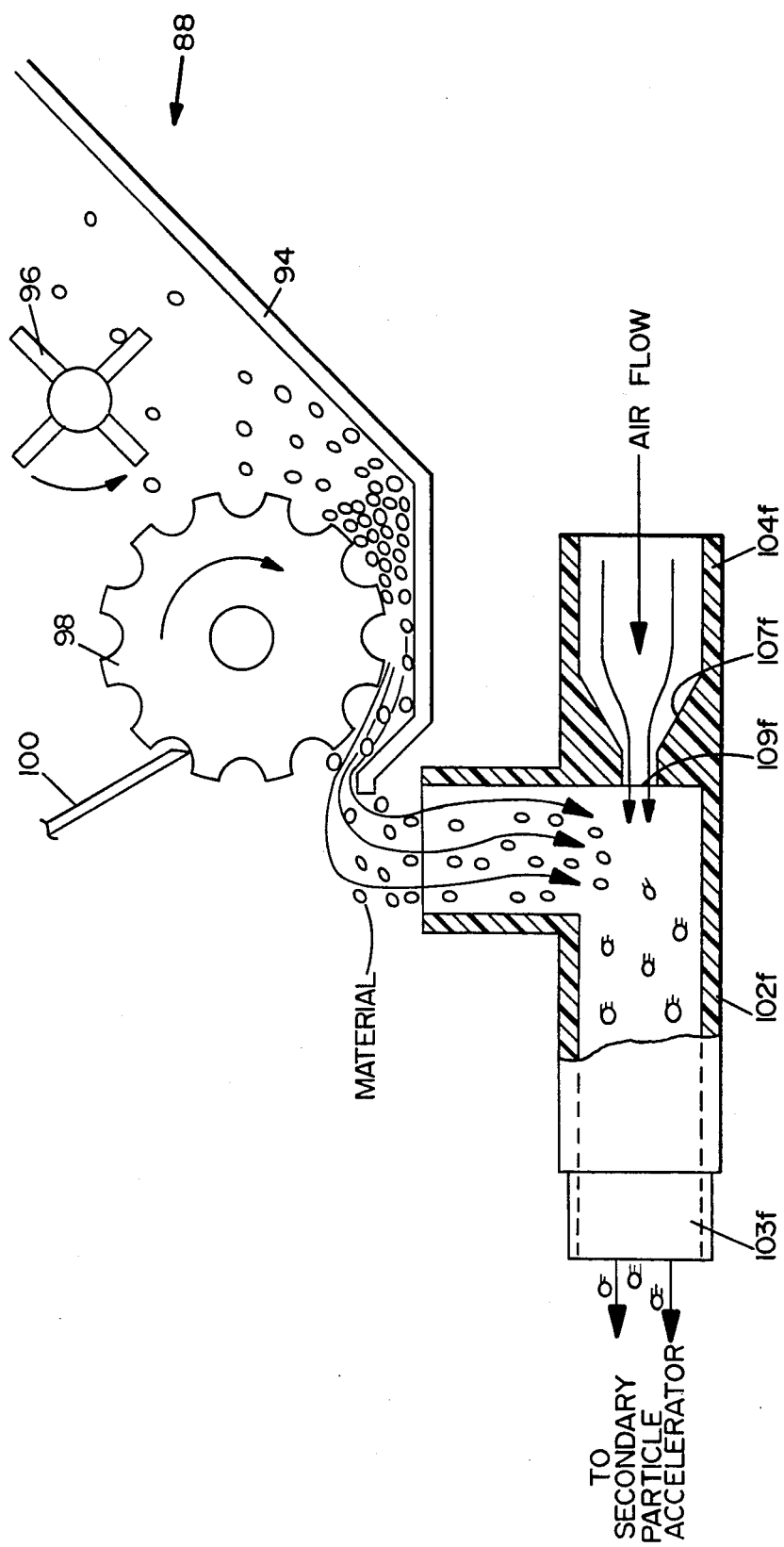

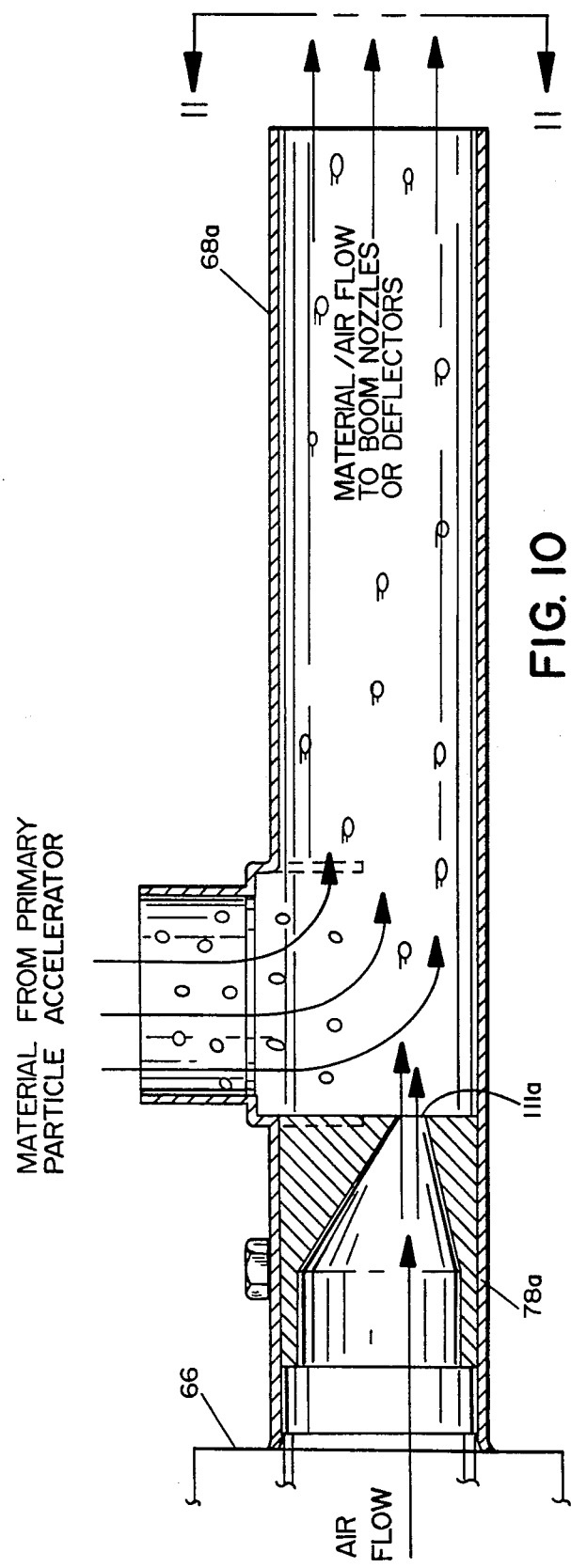
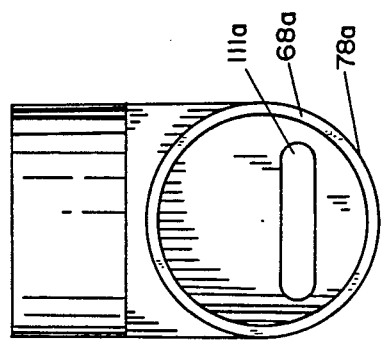
FIG. 10
FIG. 11

AIR FERTILIZER SPREADER

CROSS REFERENCE TO CO-PENDING APPLICATIONS

This application is a continuation of application Ser. No. 744,536, filed 6/14/85, now abandoned.

BACKGROUND OF THE INVENTION

1. Field of the Invention

The present invention pertains to a fertilizer spreader using compressed air as the spreading medium, and more particularly, pertains to a compressed air fertilizer spreader on a truck chassis having midship mounted booms where the booms pivot towards the rear of the truck chassis. The air fertilizer spreader also uses dual particle accelerators for propelling of the fertilizer from metering assemblies to boom tubes.

2. Description of the Prior Art

Prior art fertilizer spreaders have usually had boom assemblies which mount on the rear of a truck chassis which extend outwardly from either side of the rear when in operation and pivot forwardly towards the front of the vehicle during storage and transportation. The prior art fertilizer spreaders provided a very rear end-heavy structure which was awkward, since it swung toward an interfering object or structure when the truck was steered away from the interfering object.

Additionally, and more importantly, the boom structure is subjected to far less damaging vertical forces which occur as this off road vehicle traverses rough ground, since it is mounted midway between the front and rear axles rather than cantilevered behind the rear axle.

Another prior art problem was achieving even spreading of fertilizer from the fertilizer box out through boom tubes. The prior art generally used forced air to propel fertilizer down boom tubes to the end of the tube. Forced air principles do not always provide for even regulation and distribution of the fertilizer from a metering or dispensing point to the end of the boom tube, resulting in uneven application of the fertilizer. Further, prior art forced air spreaders would cause severe abrasion in the boom tubes at the tube bend points, whereas the secondary particle accelerator considerably ameliorates this problem.

One particular prior art reference is U.S. Pat. No. 3,568,937, issued Mar. 9, 1971, to Gratalop. This patent is for a forced air spreader for spreading pulverulent or granular material and includes provisions for distributed material passing transversely into the neck of a venturi which, at its inlet, receives air supplied by a centrifugal fan which produces, in the respective pipe connection, a suction effect that draws in the said material. The material is then entrained by the current of air, being projected out of the venturi with acceleration and escaping through the respective pivotally mounted tube, which, at its end, is provided with a deflector dividing element for dispersing material thus entrained and projected where the pivotally mounted tubes effect the uniform distribution of the material over the ground. The prior art reference references a series of venturi and a pipe connection leading from each proportioning unit into the neck of the venturi. The prior art patent states that "there is a suction effect that draws in the said material, this material being entrained by the current of air, being projected out a venturi with acceleration, and escaping through the respective pivotal mounted tube, which at its end is provided with a deflector or dividing element disbursing the material thus entrained and projected." The description of the prior art reference is substantially verbatim from selected portions of the specification and claims.

The present invention pertains to a air fertilizer spreader which uses a dual particle accelerator principle for propelling fertilizer with a first particle accelerator from a metering assembly to boom tubes, and a second particle accelerator to propel fertilizer down the boom tubes. Additionally, the secondary particle accelerator will reduce wear at toe bend points in the distribution tubes. The boom tubes are also pivotally mounted providing a substantially air tight seal with the remaining tubes providing for integrity of the system. The boom tubes are pivotally mounted in a substantially vertical plane for mating with secondary particle accelerator outlets.

SUMMARY OF THE INVENTION

The general purpose of the present invention is an air fertilizer spreader for spreading of fertilizer. The air fertilizer spreader includes booms on opposing sides of a chassis which swing from a mid-portion of the chassis towards the rear of the chassis. Rear booms and outlets on the end of the chassis cover the center portion between the midship booms. The fertilizer spreader includes a fertilizer box with a unique shape which includes a conveyor screw which carries the material from the transport box to the metering boxes. A primary particle accelerator propels the fertilizer from the metering assemblies to a secondary particle accelerator, and the secondary particle accelerator, located at the entrance to the booms, propels the fertilizer along the distance of the booms.

According to one embodiment of the present invention, there is provided an air fertilizer spreader mounted on a chassis, the booms mounted at a mid-point or midship on the chassis. The fertilizer is dispensed down through left and right metering assemblies, through a primary particle accelerator, up to a secondary particle accelerator, and out through boom tubes. Rear booms, including rear secondary particle accelerators, cover the area at the rear of the fertilizer box. In this particular embodiment, a truck chassis supports a fertilizer box and a forward boom support structure which mounts between the truck cab and the front of the fertilizer box. The secondary particle accelerator provide for right angle feed of the fertilizer into each of the boom tubes overcoming the problems of the prior art where the fertilizer would abrasively destroy and eat through the boom tubes.

One significant aspect and feature of the present invention are boom assemblies which mount at a mid-section or mid-ship of the chassis in the fertilizer box. In this particular specification, the boom mounts midpoint, behind the truck cab and forward of the fertilizer box.

Another significant aspect and feature of the pressure invention is a use of primary and secondary or first and second particle accelerator which provide for even propelling and distribution of the fertilizer through the boom tubes. This enhances even distribution and spreading of the fertilizer at the exits of the boom tubes.

A further significant aspect and feature of the present invention is a fertilizer box which includes a unique shape which insures that fertilizer will be available to a forward right and a forward left metering portion of the fertilizer box as the fertilizer is carried forward from a rear transport section of the fertilizer box.

An additional significant aspect and feature of the present invention is an air fertilizer spreader which is not only efficient in operation providing for the spreading of pulverized or granular dry fertilizer, but alternatively, by substituting specially designed metering rolls, can spread a material formed by impregnated granular fertilizer with liquid herbicides and/or pesticides.

Having thus described the embodiments of the present invention, it is a principal object thereof to provide an air fertilizer spreader for spreading of either dry fertilize or chemically treated fertilizer.

One object of the present invention is a mid-ship or mid-point mounted booms which extend outwardly from a mid-position of a chassis. This provides for mobile stability and integrity of the fertilizer system.

Another object of the present invention is to provide a distribution system using a first and second, or primary and secondary particle accelerator for propelling fertilizer as dispensed from a metering assembly down the boom tubes by use of those primary or secondary particle accelerators.

A further object of the present invention is a fertilizer spreading system which is self-contained in having a uniquely configured and divisioned box for dividing fertilizer between left and right boom assemblies, the system being self-contained including hydraulics and air supply. A intake tube mounted above the fertilizer box includes that air intake is dust free providing for the integrity of supply of air for even distribution throughout each of the boom tubes, as well as the rear boom and boom tubes.

BRIEF DESCRIPTION OF THE DRAWINGS

FIG. 9 illustrates a schematic view of the metering assembly and a first particle accelerator;

FIG. 10 illustrates a sectional view of a second particle accelerator;

FIG. 11 illustrates a view taken along line 11—11 of FIG. 10; and

DESCRIPTION OF THE PREFERRED EMBODIMENTS

Figure 1:
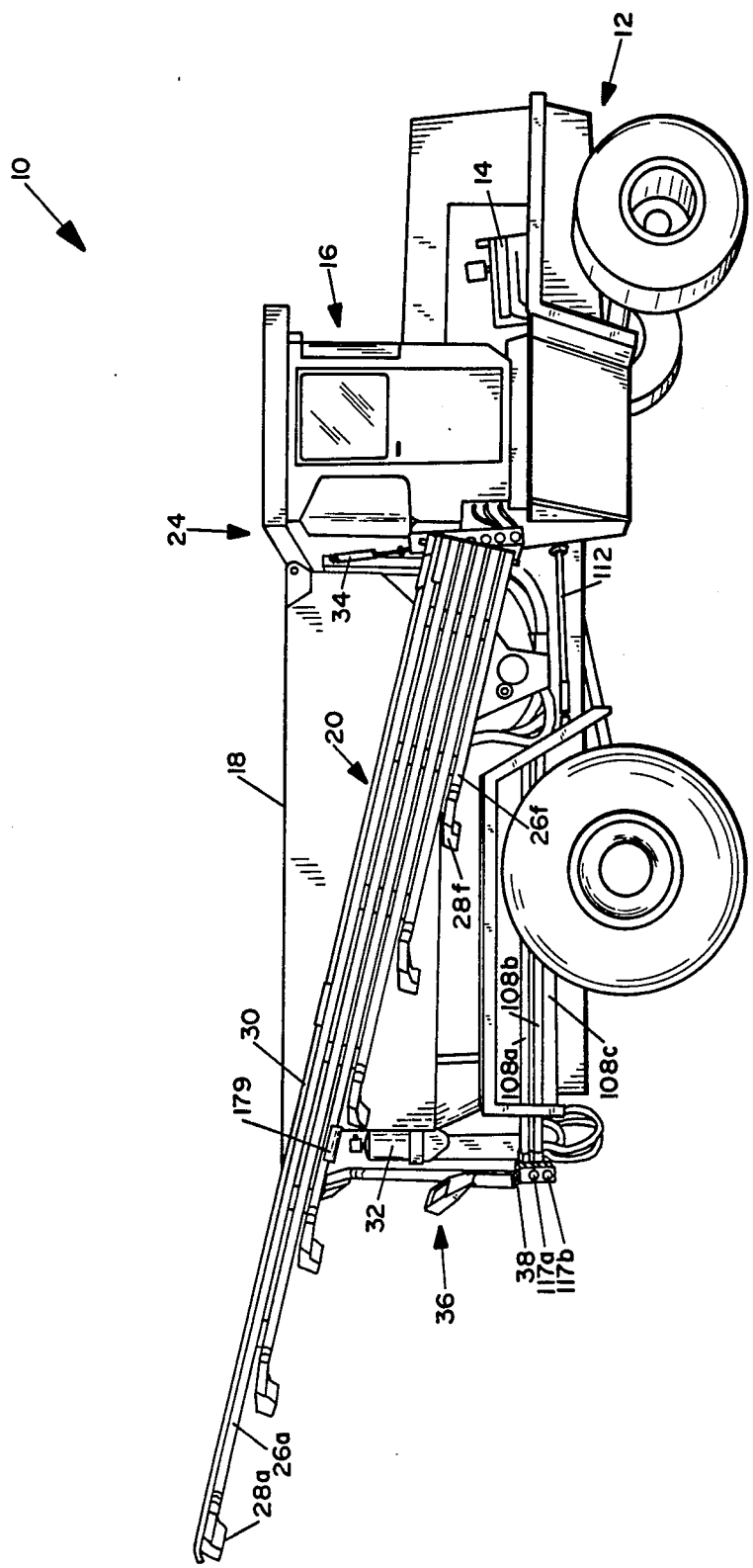
FIG. 1 illustrates a side view of an air fertilizer spreader system, the present invention, with booms stowed.

FIG. 1 illustrates a side view of an air fertilizer spreader system 10 including a truck chassis 12 with high flotation tires for moving through agricultural fields, and engine 14 with a hydraulic powered take-off unit, and a truck cab 16. A fertilizer box 18, as later described in detail, mounts on a rear portion of the truck chassis 12 and the cab 16 mounts on a forward portion. The left side of the spreader system is a mirror image of the right side, and some elements of the left side are specified and numbered but not all elements are necessarily numerically called out for the sake of brevity. At a mid-portion of the truck chassis, a right boom 20 and left boom 22 are pivotally mounted on a boom support assembly 24, as illustrated in FIG. 7 and later described in detail. The right boom 20 includes six boom tubes **26*a*–26*f*, six deflectors 28*a*–28*f*, and a foam marker 30. Foam is supplied from a foam marker tank 32. A right boom lifting cylinder 34 lifts the boom assembly 20. A right rear boom assembly 36 pivots about a point 38**.

FIG. 2 illustrates a front view of the present invention with the booms fully extended. All numerals correspond to those elements previously described. A left rear boom 40 is equated to that of the right rear boom 36. The figure also illustrates the positioning of the right and left booms forward of the fertilizer box 18 and rearward of the truck cab 16, at a mid-point position of the truck chassis, also referred to as a mid-ship position of the truck chassis 12.

FIG. 3 illustrates a rear view with the right and left booms 20 and 22 extended. The right boom 20 includes a pivot point 44 providing for breakage protection, as well as a pivot point shock absorber 46. Likewise, the left boom 22 is provided with a shock absorber 48 at pivot point 50. Hydraulic cylinders 52 and 54 actuate the righr rear boom 36 and the left rear boom 40. Center deflectors 56 and 58 fill in the rear spreading between the left rear boom 40 and right rear boom 36. Members 17 serve as boom supports when the booms are in a stowed position.

FIG. 4 illustrates a front quarter view of the right side of the air fertilizer spreader system 10 including the truck chassis 12 and the cab 16. The booms are provided with boom spacer bars **60*a*–60*n* and extend outwardly from a boom bar plate 62 provided with a plurality of boom inlets 64*a*–64*f* which mate with corresponding outlets 68*a*–68*f* in plate 66. The boom assembly 20 pivots about rod 70 on boom tube brackets 72 and 74. Right forward plenum 76 feeds air to secondary particle accelerators 78*a*–78*f* as further illustrated in FIGS. 6, 10 and 12** and as later described in detail providing for material and air flow to the boom.

FIG. 5 illustrates a rear quarter side view with the right boom 20 fully extended. All numerals correspond to those elements previously described. As shown in this Figure and FIG. 6, fan 80 driven by a hydraulic motor pressurizes air for subsequent feeding to the right forward plenum 76 through a right hose 82, and likewise to a left plenum 84 through a left hose 86, as illustrated in FIG. 6. Fan 80 derives clean air from an air intake tube 81 via hose **81*a* which connects the the fan 80. The air intake tube is of a height greater then the fertilizer box and substantially forward of the fertilizer box and booms so that clean air is supplied to the fan which prevents dust clogging of the system. Material falls from a right forward hopper 18*a* through a right metering device 88 including a drive agitator sprocket 90 and a feed roll sprocket 92. The metering assembly includes a hopper 94, an agitator 96, and a feed roll 98. For impregnated or damp materials a feed roll scraper 100 is shown in 9. The fertilizer is metered down and passes through a plurality of six right primary particle accelerators 102*a*–102*f* to the secondary particle accelerators 78*a*–78*f*. The primary particle accelerators 102*a*–102*f* are pressurized from hoses 104*a*–104*f*** by air supplied from the right rear side of main plenum 106 and routed through large hose 107 which passes through air divider 99, through hoses 104a–104f to particle accelerators 102a–102f through hoses 103a–103f. Particle accelerators 101a–101c are pressurized by the right forward side of the main plenum 106 by hoses 107a–107c whereupon which fertilizer from the metering device 88 joins with the air flow through hose pipe combinations 108a, 108b, and 108c to be carried to the rear area of the spreader aft of the bin 18. Hose/pipe combinations 108a and 108b carry fertilizer and air to the rear boom 36 and the inlets of secondary particle accelerators 117a and 117b. Hose/pipe combination 108c carries air and fertilizer to center deflector 58 for direct distribution to the ground. Right forward plenum 76, and hose 77, pressurize the frame 12 for carriage of pressurized air to the rear secondary particle accelerators 117a and 117b's appropriate air input hoses.

Additional support structure includes a stabilizer bar 112 secured to the chassis 12 to provide support for the boom frame 164. A preventer cable 114 is secured to the mid-portion of the boom 20 keeping the boom from swinging forward of the cab. A right horizontal boom actuator 116 positions the boom horizontally in either the stowed or extended position while the right boom lift actuator 34 positions the boom 20 vertically, while left horizontal boom actuator 115 position the left boom in a like manner.

Access assembly 89 on the metering device 88 pivots forward for cleaning of metering device 88 components while a stop plate 87 is inserted above the hopper 94 to arrest fertilizer flow in a downward direction.

FIG. 6 illustrates a top view fertilizer box 18 including a rearward V-box 18c, a forward right box 18a, and a left box 18b. A conveyor screw and tube 120 carries fertilizer forward for discharge into boxes 18a and 18b. The metering device 88 and corresponding left metering device 124 meter the material as previously described. The top V section 126 of the forward boxes 18a and 18b forms the top of the main air plenum 106. Each of the forward boxes or hoppers 18a and 18b are formed by welded sheet metal sides for gravity feed of the material to the metering devices, including the agitator 96 and feed roll 98 of the right metering assembly 88. The material is then propelled by the primary particle accelerator from the metering assembly to the secondary particle accelerator for subsequent propelling down each of the boom tubes. The FIG. illustrates the right boom 20 extended, while the left boom 22 is collapsed and stored. Also illustrated are the right and left forward air plenums 76 and 84, the frame pressurizing hoses 77 and 79 to the left and right rear boom secondary particle accelerators, as well as other structure which corresponds to those elements previously described.

FIG. 7 illustrates a view of the boom frame as viewed from the cab where all numerals correspond to those elements previously described. The structure includes right spring 152, left spring 154, bar end 156, and a compensation slide track 158 for movement of the bar 160. Springs 152 and 154 in action with compensation bar 160 about pivot 162 provide for level operation of the right forward boom 20 and left forward boom 22 when traveling over uneven ground. Frame 164 is U shaped and connects to the lower box frame which in turn is attached to the truck chassis 12. Frame 164 also supports the right boom lifting cylinder 34, the left boom lifting cylinder 132, and the left boom pivot tube 166. Right secondary particle accelerator housing 168 is identical in structure and operation to that of the right secondary particle accelerator housing.

FIG. 8 illustrates a hydraulic system diagram of operation for the air fertilizer system. A truck power take-off unit drives the charge pump 180, the variable volume pump 182 and the aux system gear pump 184. Hydraulic fluid is supplied from a hydraulic reservoir 186, through a strainer 188 and returned through a cooler 190, with bypass 191, and return filter 192 to the reservoir 186. Charge pump 180, including filter 181 and relief valve 183, supplies hydraulic fluid to the variable volume pump 182 for hydraulically powering blower motor 194.

Pump 184, including relief valve 185, provides hydraulic power to the valve 196, the feed roll motor 198, fertilizer auger drive motor 200, the priority flow divider 202, and valve bank 204. The auger motor is controlled by solenoid valve 206. The priority control valve 202 connects across the control valve bank 204. The application speed control valve 196 controls the feed roll motor 198 for application verses vehicle speed parameters.

FIG. 8a illustrates the operational control valves with respect to their respective hydraulic actuators. In valve bank 204, operation control valve 206 controls the folding of the left boom 22 and the left rear boom 40 through actuators 115 and 54, respectively. Operational control valve 208 controls the folding of the right boom 20 and the right rear boom 36 through actuators 116 and 52, respectively. Control valve 210 controls left boom lifting actuator 132 and control valve 212 controls the right boom lifting actuator 34.

FIG. 9 illustrates a schematic view of the metering assembly 88 and the primary particle accelerator 102f. The metering assembly 88 includes the hopper 94, the agitator 96, the feed roll 98, and feed bar 100 for dispensing material down into the primary particle accelerator tubes 102 and 101. An area of a cone configuration 107f provides increased air flow through an opening 109f for propelling the fertilizer through the outlet hose 103f towards the secondary particle accelerator housing. Of course, it is noted that the outlet past the area of reduced cross-section, which is illustrated in FIG. 10, does not increase, thereby providing that the increase velocity stays substantially the same.

FIG. 10 illustrates a view taken along line 10—10 of FIG. 5 and rotated upwardly 90 degrees for purposes of illustration. The reduced section of cross-diameter 111a provides the modified particle accelerator effect of increasing material flow at the right angle bend, while also not causing any abrasion at the right angle bend from the material.

FIG. 11 illustrates a view taken along line 11—11 of FIG. 10 where all numerals correspond to those elements previously described showing the outlet end view operating on a modified particle accelerator principle.

FIG. 12 illustrates an air flow diagram 250 for flow of the air and fertilizer through the air fertilizer spreader system 10. Fan 80 generates air pressure into main plenum 106, which is divided, as illustrated, through the dividers and fed directly to other elements as indicated. Air subsequently passes through the primary particle accelerator, through the secondary particle accelerator for the carrying of fertilizer. The fertilizer passes from the hopper through the metering assembly, through the primary particle accelerator, through the secondary particle accelerator, out to the front boom deflectors, and in a rearward direction from the primary particle accelerators to the center deflectors in the rear, and rear secondary particle accelerators to the rear booms.

MODE OF OPERATION

Figure 2:
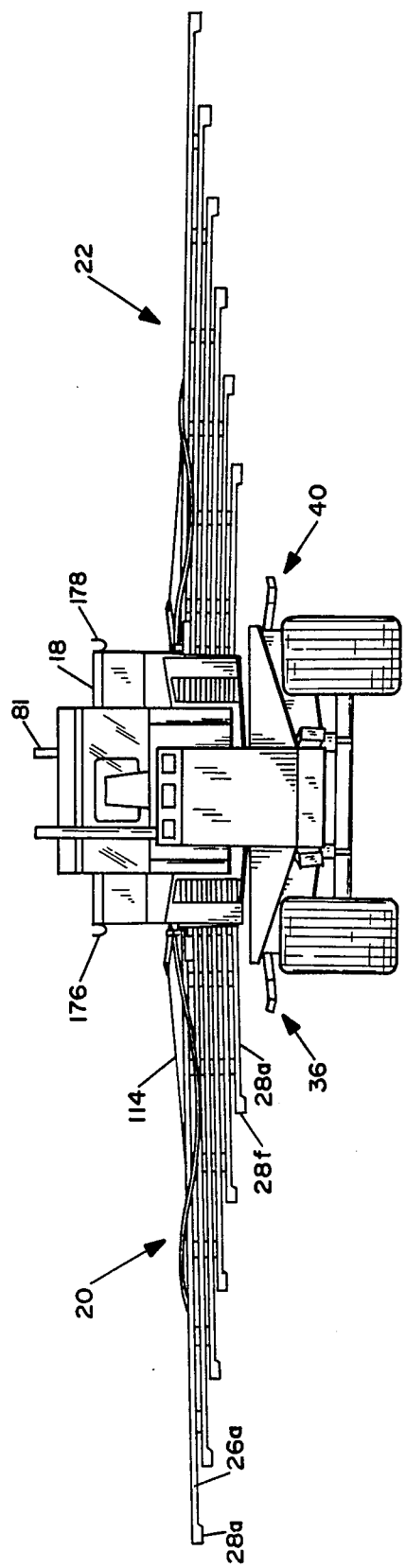
FIG. 2 illustrates a front view with the booms extended.
Figure 3:
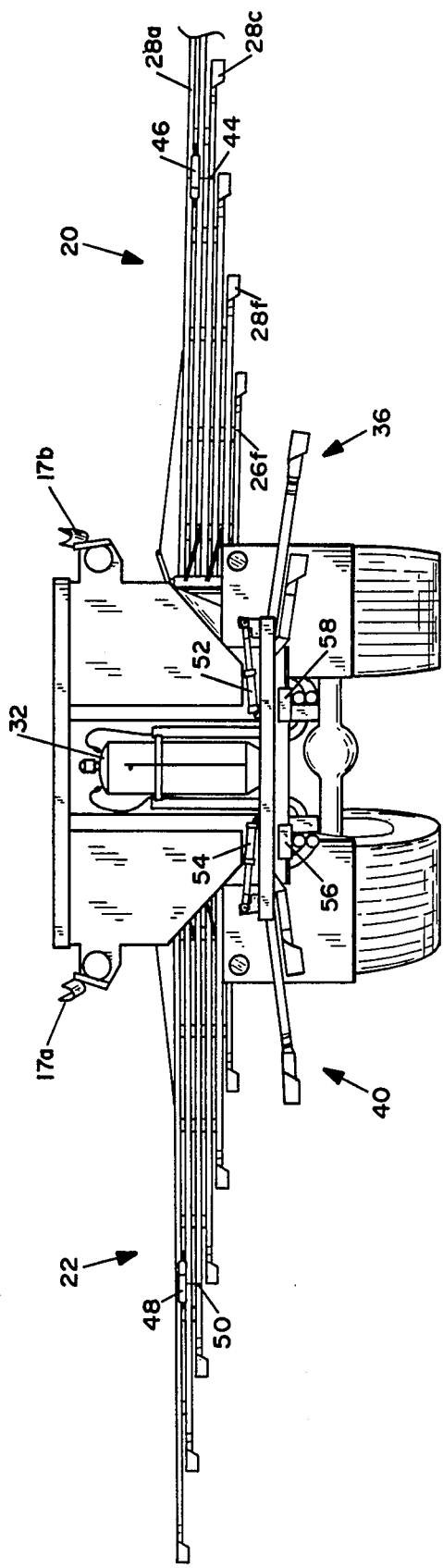
FIG. 3 illustrates a rear view with the booms extended.
Figure 4:
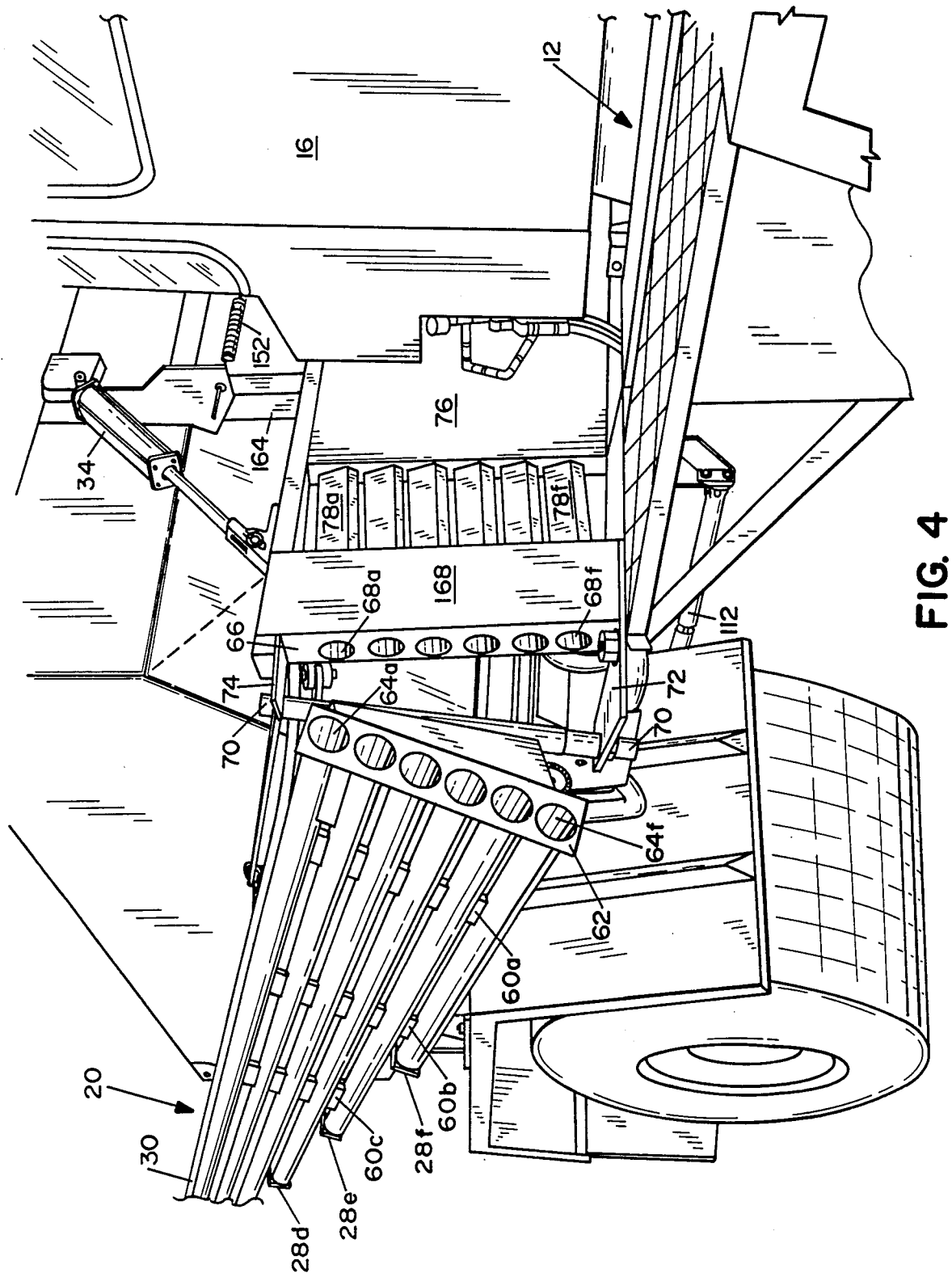
FIG. 4 illustrates a front quarter view with the booms stowed.
Figure 5:
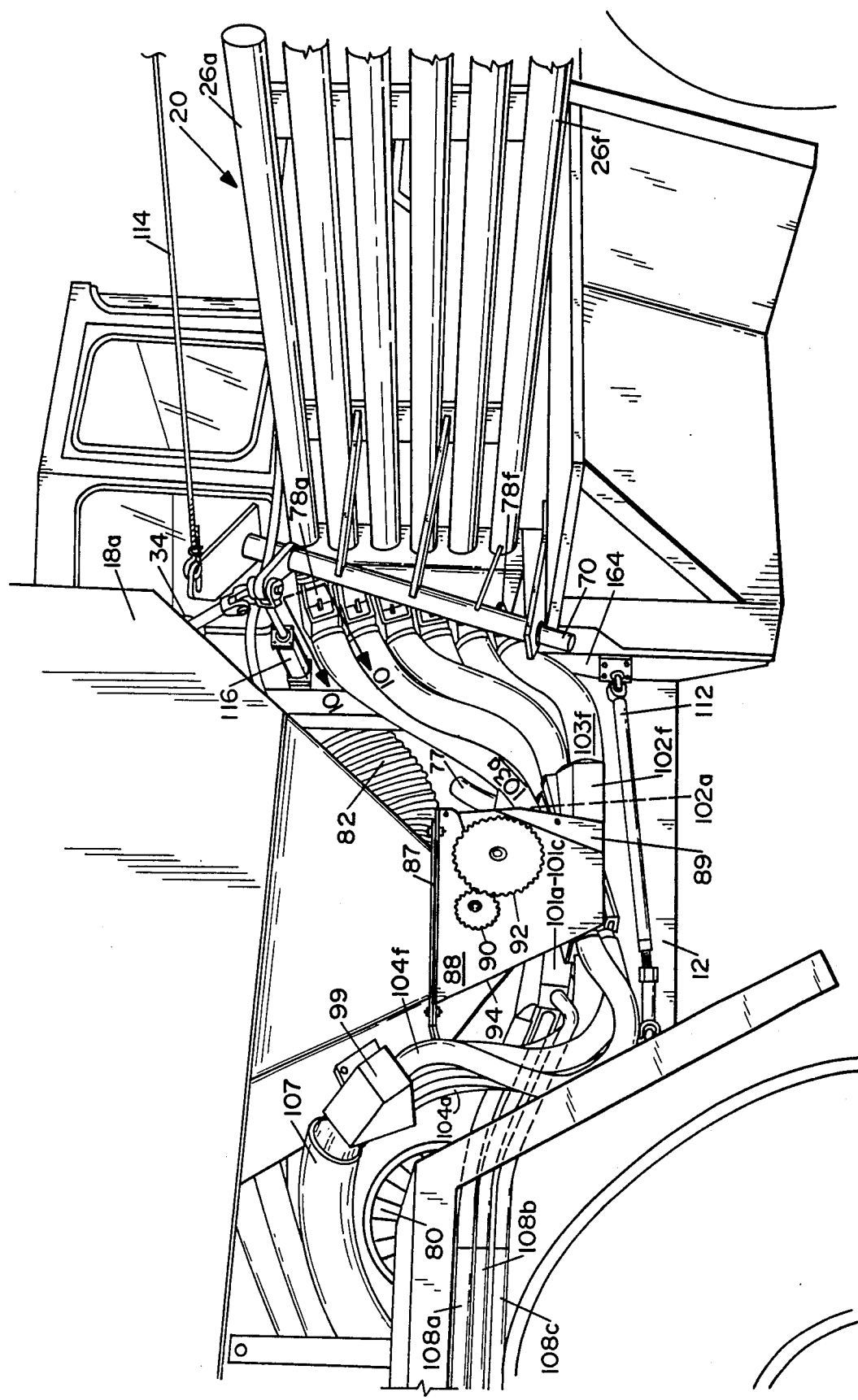
FIG. 5 illustrates a rear quarter side view.
Figure 6:
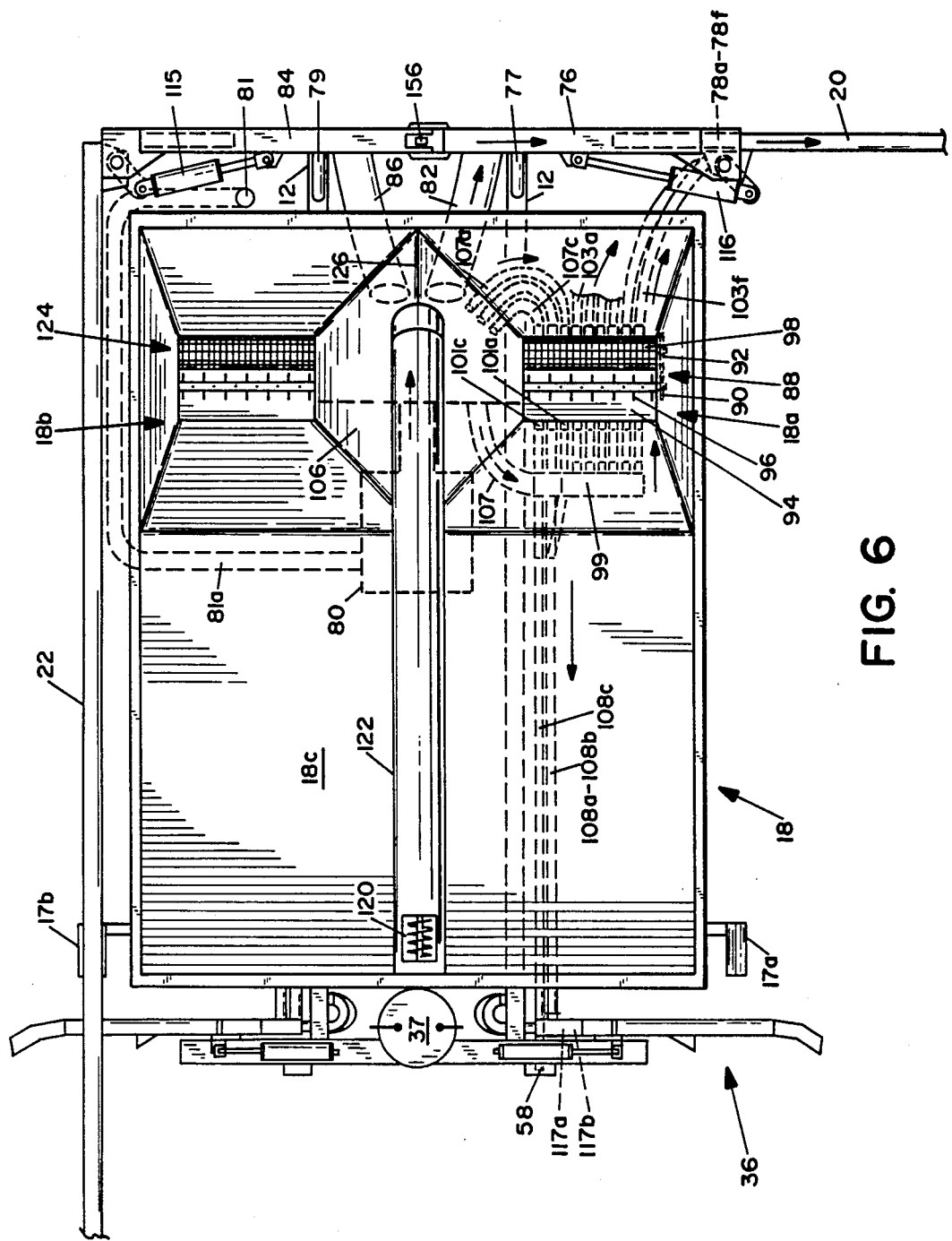
FIG. 6 illustrates a top view.
Figure 7:
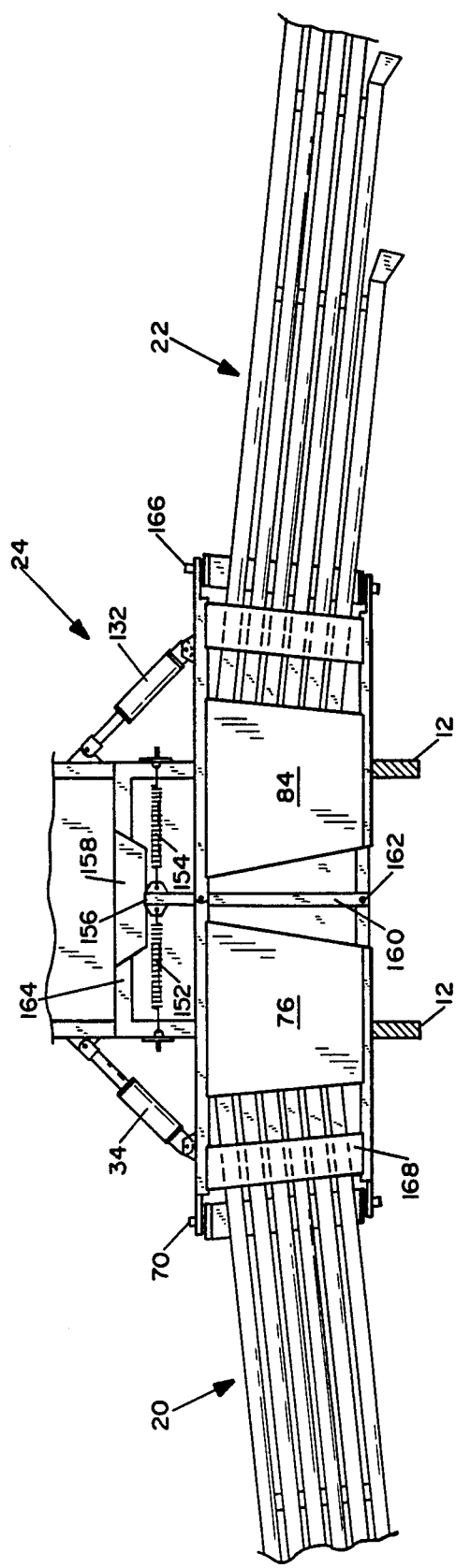
FIG. 7 illustrates a view of the boom frame as viewed from the cab.
Figure 8:
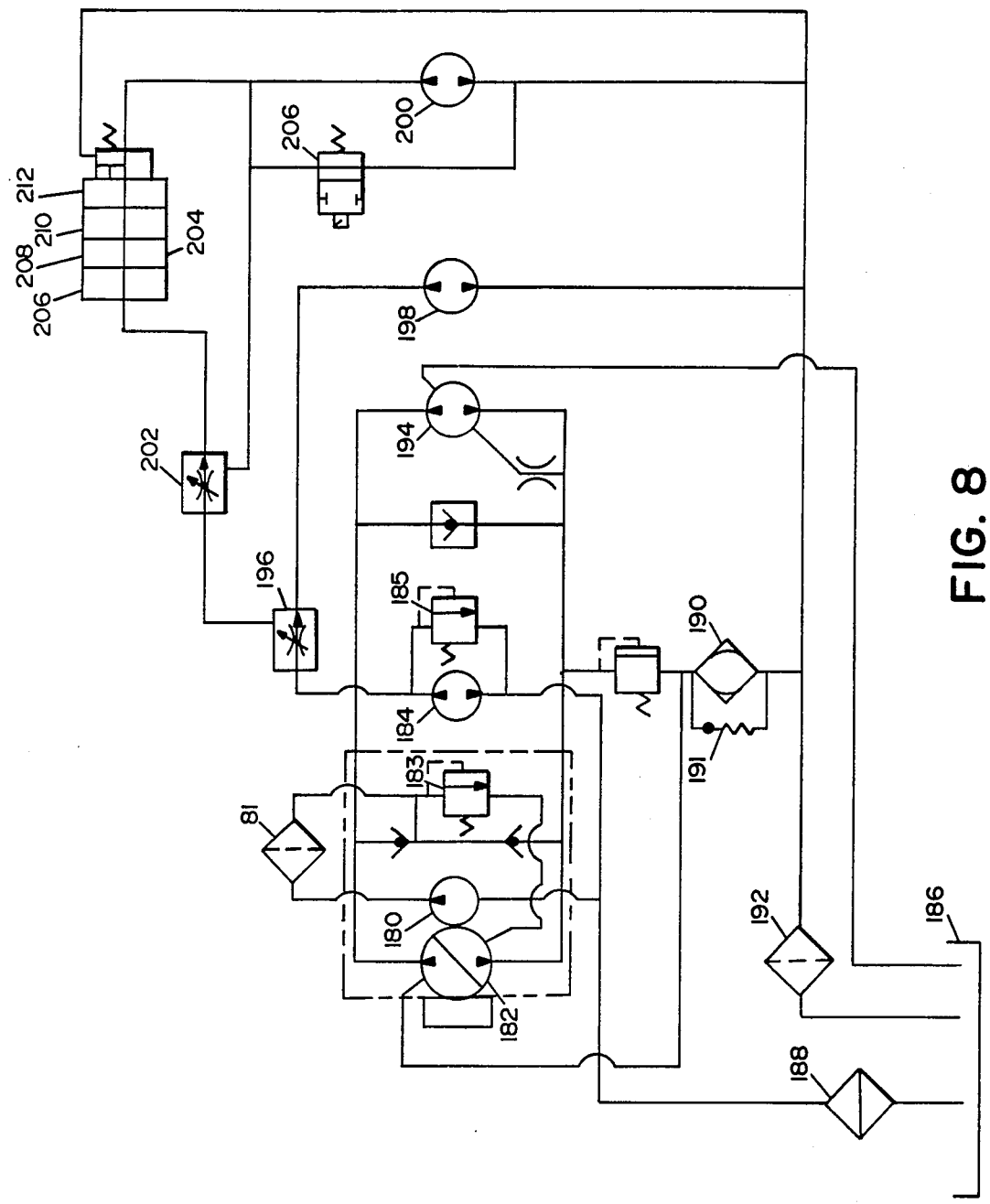
FIG. 8 illustrates a hydraulic system schematic.
Figure 8A:
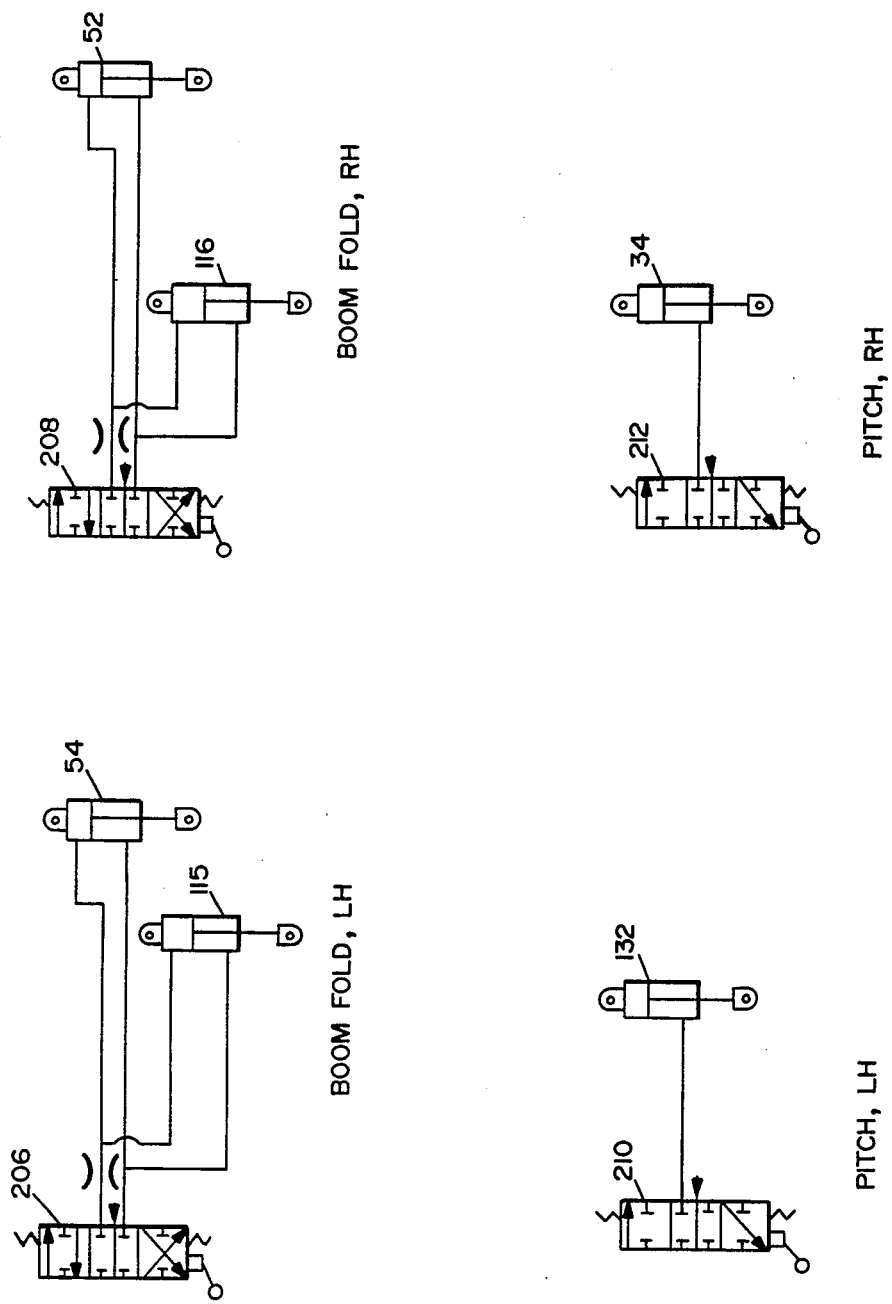
FIG. 8a illustrates the hydraulic control valves and actuator schematic.
Figure 12:
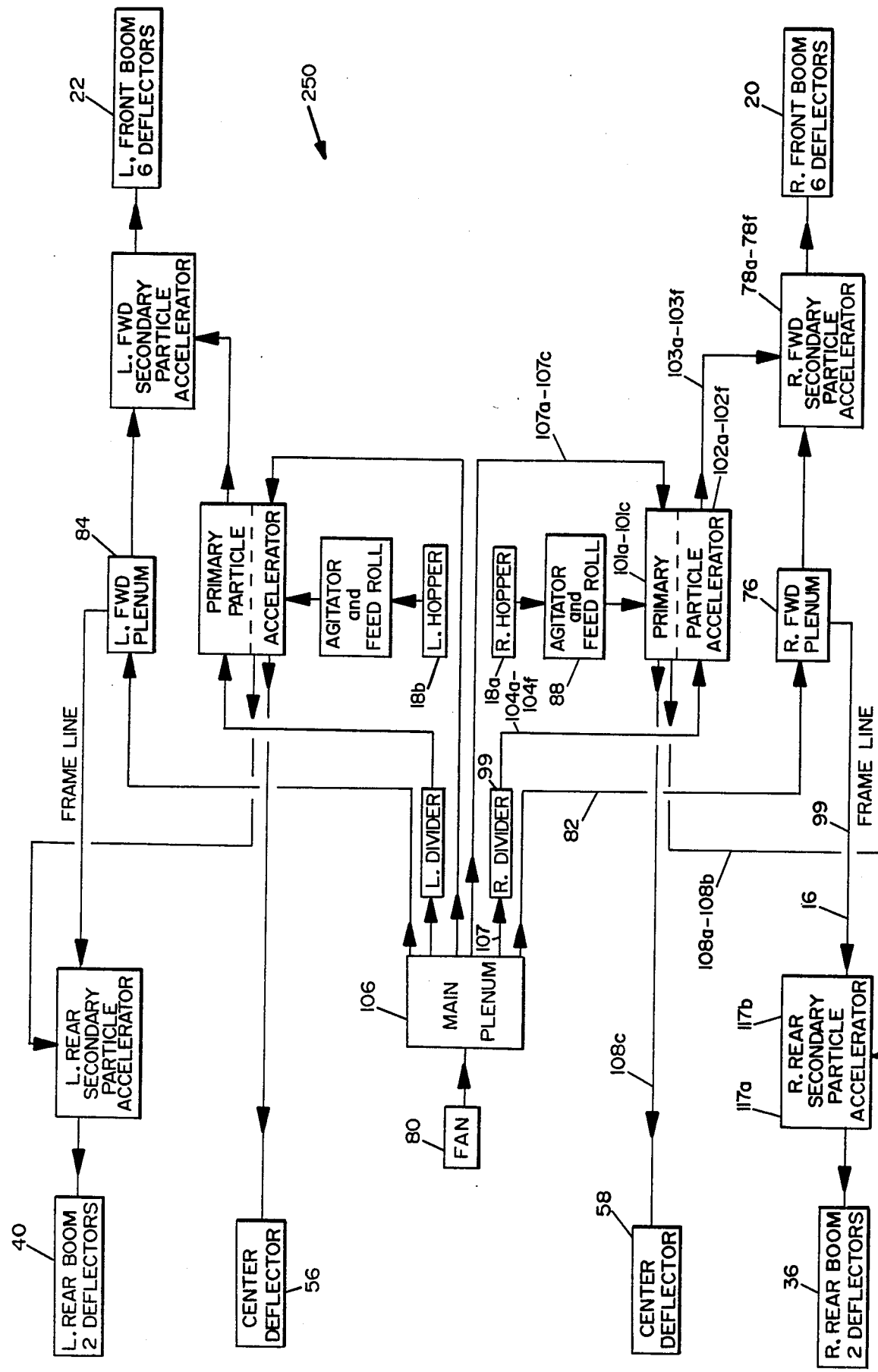
FIG. 12 illustrates a schematic diagram of air flow.

In operation, the left and right booms are actuated to a midship position as illustrated with the booms in a stowed away position, FIG. 1, to a midship position as illustrated in FIGS. 2 and 3. The booms are then leveled with the lifting cylinders, as illustrated in FIG. 7, with respect to the ground. The fertilizer, of course, has already been loaded into the box, and the operator then engages the hydraulics to power the conveyor tube to move fertilizer up from the rear box to the left and right forward boxes. The blower is then started and the hydraulics also power the metering assembly for dispensing of material down into the first particle accelerator which is subsequently picked up by air and propelled to the second particle accelerator, whereby that particle accelerator picks up the fertilizer and propels the fertilizer particulates down the boom tubes for subsequent dispensing. The booms can be operated independently of each other as so desired.

FIG. 3 best illustrates the dispensing of the six boom tubes on each side of the hopper, the rear booms as well as the center deflectors.

The midship features of the fertilizer spreader provides considerable safety to not only the individual using the unit, but also to the individuals in the immediate vicinity. The booms have the unique feature of swinging backwards toward the rear of the truck. Also, the right angle features of particle acceleration of the fertilizer particulate provides that the boom tubes do not wear out where the fertilizer makes a right angle turn which has been common in prior art devices. Further, the particle acceleration of the fertilizer particulate is even, providing for even distribution of the fertilizer.

While the air fertilizer spreader system has been disclosed for dry particulate fertilizer, the fertilizer can also be chemically treated. The same principles of the specification are applicable to chemically impregnated fertilizers as well.

The aggregate particle accelerator fluidizes particles of given aggregate with air for flow through a transfer media, such as a tube or hose, and for ejection at a new location.

VA = Velocity of air through a orifice
MA = Mass of air flowing through a orifice
VF = Velocity of air and material through transfer tube
T = Time
MM = Mass of material entering system 1. Air is forced through the orifice at velocity VA, by a pressure source such as a blower.
2. Particles of a specified material are dropped or blown through the feed port and enters the high velocity stream of air flowing from the orifice.
3. When the high velocity air collides with the particles, the air accelerates the particles in the direction of the transfer tube, and in turn the air is decelerated. This acceleration/deceleration continues until the air and material are at equal velocities, which must be fast enough to maintain the material particles and air in a fluidized state. The transfer tube is not increased in size from its inlet because this would cause a reduction in velocity and allow the particles to drop out of suspension.
4. Theoretically, the balance of this system is expressed by the following equation at the maximum efficiency of the system.

$$M - VA = \frac{VA - VF}{T} \cdot MA + \frac{VF}{T} \cdot MM$$

During the operation of the system, two major areas of efficiency loss may occur. The first is the resistance to flow through the transfer tube and the second is loss of input air through the feed port. This occurs when the reaction force of the air accelerating the material particles becomes greater than the pressure of the air at the inlet port. At this point, some of the input air starts to flow up and out of the feed port. As the feed rate is increased, the back pressure and back flow increases until the pressure reaches a point where back flow prevents any additional material from entering the high speed stream of air. This problem is minimized by increasing the pressure at the feed port to match the back pressure.

I claim:
1. An air fertilizer spreader system comprising:
   a truck having a truck chassis means, a motor means, and a truck cab located on a forward portion of said truck chassis means;
   fertilizer hopper means adapted to hold solid fertilizer particles located on a rear portion of said truck means;
   right and left pivotally mounted boom means positioned between said fertilizer hopper means and said truck cab;
   each of said right and left pivotally mounted boom means including a corresponding one of right and left pivot means, and means and first tube means;
   each of said right and left first tube means extending between a corresponding one of said right and left pivot means and end means;
   said right and left pivotally mounted boom means each having a stowed position and an outward position, whereby said each of said right and left boom means swings outwardly about its corresponding pivot means from a rear position of said truck chassis;
   transfer means for transferring fertilizer from said hopper means to said right and left pivotally mounted boom means for subsequent spreading; and
   said transfer means including second tube means communicating with said first tube means for conveying fertilizer to said first tube means and a source of air under sufficient pressure communicating with said second tube means for moving said solid fertilizer particles into said first tube means at a sufficient velocity to maintain a fluidized mass of air and fertilizer particles.
2. An air fertilizer spreader system according to claim 1 further comprising a back boom at the rear of said truck means for fertilizing areas which said side booms do not cover and connected through said transfer means to said hopper means.
3. An air fertilizer spreader system according to claim 1 wherein said right and left boom means can be operated independently of each other for finishing up at field edges.
4. An air fertilizer spreader system comprising:

a truck having a truck chassis means, a motor means, and a truck cab located on a forward portion of said truck chassis means;

fertilizer hopper means adapted to hold solid fertilizer particles located on a rear portion of said truck means;

right and left pivotally mounted boom means positioned between said fertilizer hopper means and said truck cab;

each of said right and left pivotally mounted boom means including a corresponding one of right and left pivot means, end means and first tube means;

each of said right and left first tube means extending between a corresponding one of said right and left pivot means and end means;

said right and left pivotally mounted boom means each having a stowed position and an outward position, whereby each of said right and left boom means swings outwardly about its corresponding pivot means from a rear position of said truck chassis;

transfer means for transferring fertilizer from said hopper means to said right and left pivotally mounted boom means for subsequent spreading;

said transfer means including second tube means communicating with said first tube means for conveying fertilizer to said first tube means and a source of air under sufficient pressure communicating with said second tube means for moving said solid fertilizer particles into said first tube means at a sufficient velocity to maintain a fluidized mass of air and fertilizer particles;

right and left metering means;

said transfer means including right and left fertilizer conveyor means;

each of said right and left fertilizer conveyor means extending from said hopper means to a corresponding one of said right and left metering means;

said transfer means communicating with said right and left metering means and including first right and left venturi means for moving fertilizer from said right and left metering means along said transfer means;

second right and left venturi means connected down from and between each of said primary venturi means and at an angle thereto for moving fertilizer through said right and left boom means; and each of said venturi means powered from said pressurized air means.

5. An air fertilizer spreader system comprising:
a truck having a truck chassis means, a motor means, and a truck cab located on a forward portion of said truck chassis means;

fertilizer hopper means adapted to hold solid fertilizer particles located on a rear portion of said truck means;

right and left pivotally mounted boom means positioned between said fertilizer hopper means and said truck cab;

each of said right and left pivotally mounted boom means including a corresponding one of right and left pivot means, end means and first tube means;

each of said right and left first tube means extending between a corresponding one of said right and left pivot means and end means;

said right and left pivotally mounted boom means each having a stowed position and an outward position, whereby each of said right and left boom means swings outwardly about its corresponding pivot means from a rear position of said truck chassis;

transfer means for transferring fertilizer from said hopper means to said right and left pivotally mounted boom means for subsequent spreading;

said transfer means including second tube means communicating with said first tube means for conveying fertilizer to said first tube means and a source of air under sufficient pressure communicating with said second tube means for moving said solid fertilizer particles into said first tube means at a sufficient velocity to maintain a fluidized mass of air and fertilizer particles;

a central support member;

pivotal mounting means for mounting each of said right and left boom means on said central support member for pivotal movement relative thereto about a substantially horizontal axis at right angles to the length of the first tubular means; and means for mounting said central support member on said truck chassis means for side-to-side movement of said pivotal mounting means relative to said truck chassis means whereby said boom means are moved relative to said frame on tilting of said frame relative to the vertical to tend to self-level said right and left boom means.

6. An air fertilizer spreader system according to claim 5 further including means for biasing said central support member toward a central portion thereof.

7. An air fertilizer spreader system according to claim 6 in which:

said means for biasing includes spring means for biasing said central support member toward a central position thereof;

said pivotal mounting means including means for mounting said right and left boom means such that each boom means can pivot independently relative thereto about a substantially horizontal axis at right angles to the length of the boom means but is held against lateral movement relative thereto, and right and left linkage means each having one end thereof pivotally connected to a respective one of said right and left boom means at a position spaced from said pivotal mounting means and an opposed end thereof pivotally attached to said frame such that each right and left boom means is solely supported by said pivotal mounting means and a respective one of said linkage means; and each said linkage means including means for increasing and reducing the effective length thereof so as to raise and lower the respective arm independently of the other arm whereby said boom arms can be independently raised and lowered by said linkage means and whereby common side-to-side movement of said central support member and arms provides a self-levelling effect to tend to accommodate tilting of the frame relative to the vertical.

8. An air fertilizer spreader according to claim 6 wherein said biasing means comprises a pair of resilient springs interconnected on respective sides of said central support member to said truck chassis means.

9. An air fertilizer spreader according to claim 7 wherein said linkage means is coupled to said respective right and left boom means outwardly of the central support member and is arranged to extend upwardly therefrom to support the arm against downward pivotal movement relative to said pivotal mounting means.

10. An air fertilizer spreader according to claim 5 wherein said linkage means extends upwardly and inwardly from said arm.

11. An air fertilizer spreader according to claim 10 wherein said central support member is pivoted at a lower end thereof and includes guide means for guiding said side-to-side movement.

* * * * *